United States Patent [19]
Bardmesser

[11] Patent Number: 6,091,461
[45] Date of Patent: Jul. 18, 2000

[54] ELECTRONICALLY SELF-ALIGNING HIGH RESOLUTION PROJECTION DISPLAY WITH ROTATING MIRRORS AND PIEZOELECTRIC TRANSDUCERS

[75] Inventor: George S. Bardmesser, Woodcliff Lake, N.J.

[73] Assignees: Sony Corporation, Tokyo, Japan; Sony Corporation of America, New York, N.Y.

[21] Appl. No.: 08/911,457

[22] Filed: Aug. 14, 1997

[51] Int. Cl.[7] .................. H04N 5/64; H04N 3/10; H04N 5/74

[52] U.S. Cl. .................. 348/744; 348/745; 348/195; 348/203; 348/756; 348/757; 348/760; 359/201; 359/202

[58] Field of Search .................. 348/756, 757, 348/760, 195, 203, 202, 204, 205, 744, 745; 359/201, 202; 250/230, 234–6; 347/256–61

[56] References Cited

U.S. PATENT DOCUMENTS

| | | | |
|---|---|---|---|
| 3,506,328 | 4/1970 | Seki | 359/216 |
| 3,647,956 | 3/1972 | Buck et al. | 348/203 |
| 3,896,362 | 7/1975 | Street | 318/640 |
| 3,909,105 | 9/1975 | Neiswander et al. | 359/201 |
| 3,944,323 | 3/1976 | Starkweather | 359/215 |
| 4,002,830 | 1/1977 | Brown et al. | 358/481 |
| 4,143,403 | 3/1979 | Ohnishi | 348/203 |
| 4,203,672 | 5/1980 | Smith | 356/431 |
| 4,219,704 | 8/1980 | Russel | 369/108 |
| 4,404,596 | 9/1983 | Juergensen et al. | 358/481 |
| 4,479,144 | 10/1984 | Yamazaki et al. | 348/788 |
| 4,574,197 | 3/1986 | Kliever | 250/334 |
| 4,943,871 | 7/1990 | Miyagawa | 358/496 |
| 4,978,185 | 12/1990 | Appel | 359/218 |
| 5,046,796 | 9/1991 | Andoh et al. | 359/216 |
| 5,140,427 | 8/1992 | Nakane et al. | 348/759 |
| 5,148,285 | 9/1992 | Nakane et al. | 348/196 |
| 5,170,181 | 12/1992 | Tamada | 347/232 |
| 5,194,981 | 3/1993 | Morimoto | 359/212 |
| 5,208,456 | 5/1993 | Appel et al. | 250/236 |
| 5,208,875 | 5/1993 | Virtue et al. | 382/260 |
| 5,247,174 | 9/1993 | Berman | 250/235 |
| 5,278,405 | 1/1994 | Zelenka | 250/235 |
| 5,291,333 | 3/1994 | Mills et al. | 359/601 |
| 5,315,112 | 5/1994 | Harris | 250/235 |
| 5,339,118 | 8/1994 | Tagami | 348/744 |
| 5,475,534 | 12/1995 | Okajima et al. | 359/649 |
| 5,537,159 | 7/1996 | Suematsu et al. | 348/745 |
| 5,646,766 | 7/1997 | Conemac | 359/204 |
| 5,687,020 | 11/1997 | Park et al. | 359/309 |

FOREIGN PATENT DOCUMENTS 211596  2/1987  European Pat. Off. .

*Primary Examiner*—John K. Peng
*Assistant Examiner*—Linus H. Lo
*Attorney, Agent, or Firm*—Jay H. Maioli

[57] ABSTRACT

A projection display device wherein a modulated laser beam is scanned across a viewing surface by a system of rotating mirrors. A correcting mirror is provided for introducing small variations in the path of the beam. An instantaneous position of the beam on the viewing surface is monitored and a deviation between the actual pattern traversed by the beam and a predetermined scanning pattern is detected. The angular position of the correcting mirror is adjusted to reduce the deviation between the actual scanning pattern and the predetermined scanning pattern.

10 Claims, 5 Drawing Sheets

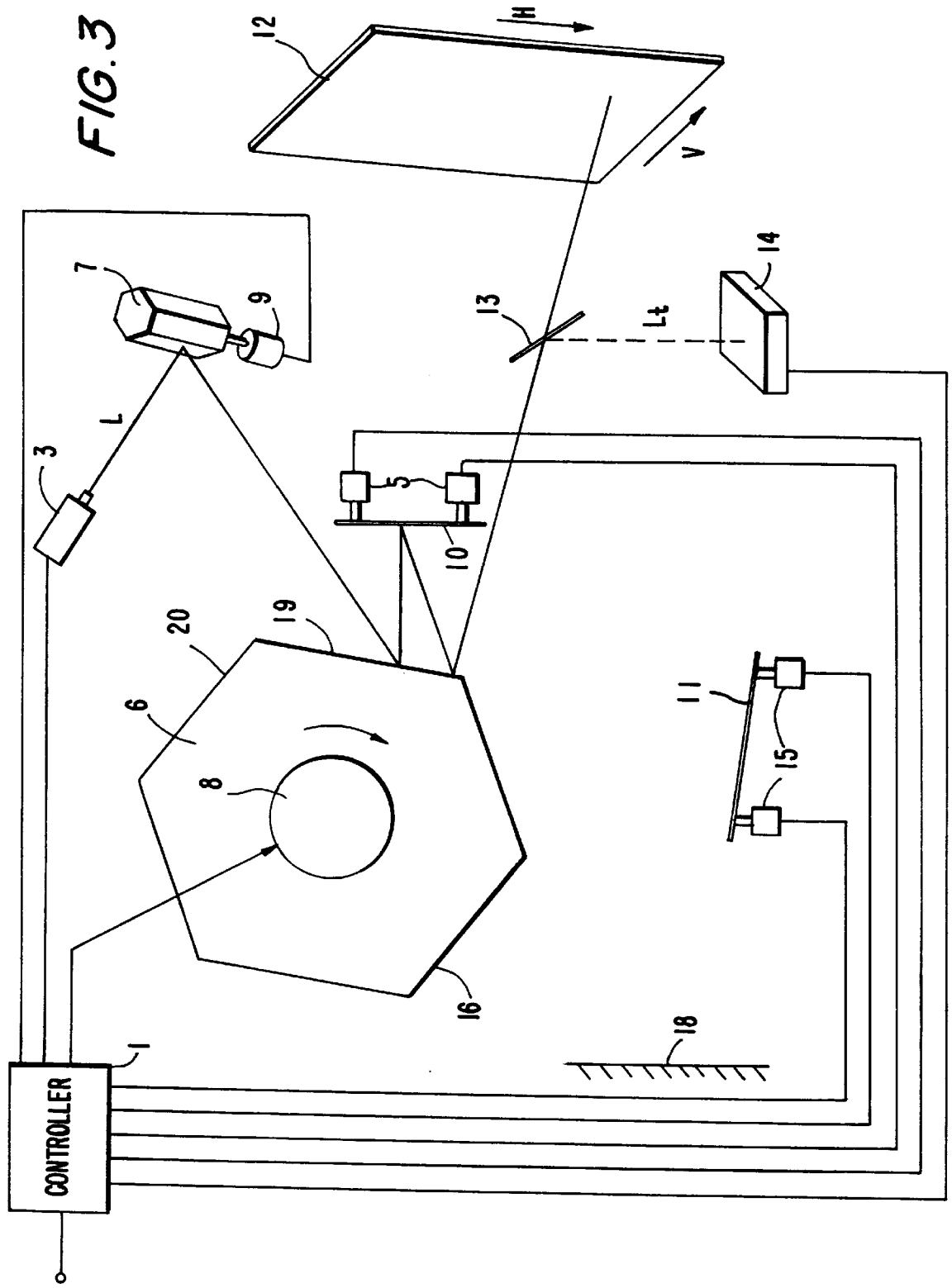

ELECTRONICALLY SELF-ALIGNING HIGH RESOLUTION PROJECTION DISPLAY WITH ROTATING MIRRORS AND PIEZOELECTRIC TRANSDUCERS

BACKGROUND OF THE INVENTION

1. Field of the Invention

This invention relates generally to the field of projection display systems. More particularly, this invention relates to a projection display system where a modulated laser beam is scanned across a surface by a system of rotating and non-rotating mirrors and where areas of the surface illuminated by the laser form pixels of a video image.

2. Description of Related Art

The present invention is an improvement to a projection display device disclosed in two co-pending applications, 7229/53235, U.S. patent application No. 08/854,872 and 7229/53243, U.S. patent application No. 08/889,405.

In 7229/53235, U.S. patent application No. 08/854,872, a beam from a laser is scanned across a viewing surface by vertical and horizontal scanning rotating mirrors. A video signal modulates the intensity of the beam. The beam is first reflected from the vertical scanning mirror to position the beam for scanning along a particular horizontal scan line. The beam is then reflected from the horizontal scanning mirror to scan the beam across the viewing surface.

Such a system is an improvement over known projection displays because the resolution and aspect ratio of the scanned image can be dynamically adjusted. Also, by using intense laser light sources, images can be projected on large viewing surfaces to create, for example, outdoor displays.

That system suffers from the problem that the rotation rate for the horizontal scanning mirror must be very high in order to properly display a video signal. For example, to display an NTSC video signal with 330 horizontal scan lines per field at a rate of 30 fields per second, a sixteen-sided horizontal scanning mirror must rotate over 600 times per second.

High rotation rates make this system susceptible to wear and vibration. Also, the radial dimension of the horizontal mirror must be small, so that the centripetal forces on the mirror do not distort its reflective surfaces. Use of small mirrors requires precise alignment of the optical components. Construction and maintenance of this precise alignment increases the cost and reduces the reliability of the system.

Co-pending application, 7229/53243, U.S. patent application No. 08/889,405, provides a solution by allowing the rotation rate of the horizontal scanning mirror to be reduced. A group of fixed mirrors are positioned so that each face of the horizontal scanning mirror sweeps the beam across the viewing surface twice. As a result, the rotational rate of the horizontal scanning mirror is reduced by a factor of one half.

Both of the systems described above suffer from the problem that the mechanical tolerances of the rotating mirrors are critical to properly scan the beam across the viewing surface. Also, the edges of each reflective face of the rotating mirrors are susceptible to distortion due to manufacturing defects. The presence of these defects reduces the usable reflective area, thus diminishing the maximum viewing area scanned by the beam on the viewing surface.

Further, alignment of the rotating and fixed mirrors in these systems is problematic both during manufacturing and when the product is in use. Realignment is necessary as parts wear and as dimensions change due to thermal expansion, as well as to correct misalignment caused by vibration. The need for precise alignment requires a skilled technician and expensive measurement equipment. This increases both the manufacturing cost and the cost of ownership of these systems.

OBJECTS AND SUMMARY OF THE INVENTION

In view of the above-mentioned shortcomings of known projection screen display devices, it is an object of the present invention to provide a display device wherein a modulated laser beam is scanned across a viewing surface by a system of rotating and fixed mirrors and wherein the optical alignment of the system is dynamically adjustable.

It is another object of the present invention to provide a high-definition projection display device using a laser scanned by a system of rotating and fixed mirrors where manufacturing defects along the edges of rotating mirror surfaces do not limit the width of the projection display.

It is yet another object of the present invention to provide a low-cost method and apparatus for aligning a high definition projection display device and for compensating for misalignment due to wear, vibration, and thermal expansion.

According to a first aspect of the present invention there is provided a laser light source modulated by a video signal for producing a modulated laser beam, a correcting mirror provided with piezoelectric transducers for reflecting the laser beam and for angularly adjusting the direction of the beam, a vertical scanning rotating mirror for receiving the laser beam from the correcting mirror and for reflecting the beam through a range of vertical angles, a horizontal scanning rotating mirror for receiving the beam reflected through the range of vertical angles and for scanning the beam through a range of horizontal angles, a beam splitter for partially reflecting the beam reflected by the horizontal scanning mirror, a viewing surface for receiving the portion of the beam not partially reflected by the beam splitter and for forming the displayed image, a sensor array for receiving the portion of the beam reflected by the beam splitter and for forming a signal indicating an instantaneous position of the beam, and a controller for controlling the rotational positions of the horizontal and vertical scanning rotating mirrors and the angular position of the correcting mirror using the piezoelectric transducers and for adjusting these parameters in response to the output from the sensor array.

According to another aspect of the present invention there is provided a laser light source modulated by a video signal for producing a modulated laser beam, a vertical scanning mirror for scanning the beam in a vertical direction, a horizontal scanning mirror, a first correcting mirror for reflecting the beam, during a first rotational period back toward the rotating mirror where it is then reflected toward a viewing surface and in a second rotational period for reflecting the beam toward a second correcting mirror, the angular position of the first correcting mirror being adjustable by a first piezoelectric positioning device, the second correcting mirror reflecting the beam toward a second face of the horizontal rotating mirror, the angular position of the second correcting mirror being adjustable by a second piezoelectric positioning device, a fixed mirror for receiving the beam reflected by the second face of the horizontal rotating mirror and reflecting the beam toward the viewing surface. A beam splitter is positioned between the system of rotating and correcting and fixed mirrors and the viewing surface that directs a portion of the beam toward an array of light sensors. A controller receives signals from the array of sensors to detect the instantaneous position of the beam and adjusts the rotation rates of the first and second rotating mirrors and the angular positions of the first and second correcting mirrors so that the beam scanned across the viewing surface follows a predetermined pattern despite mechanical deviations in the apparatus.

BRIEF DESCRIPTION OF THE DRAWINGS

FIG. 3 shows a projection display apparatus according to a second embodiment of the present invention during a first rotational period.

DETAILED DESCRIPTION OF PREFERRED EMBODIMENTS

Figure 1:
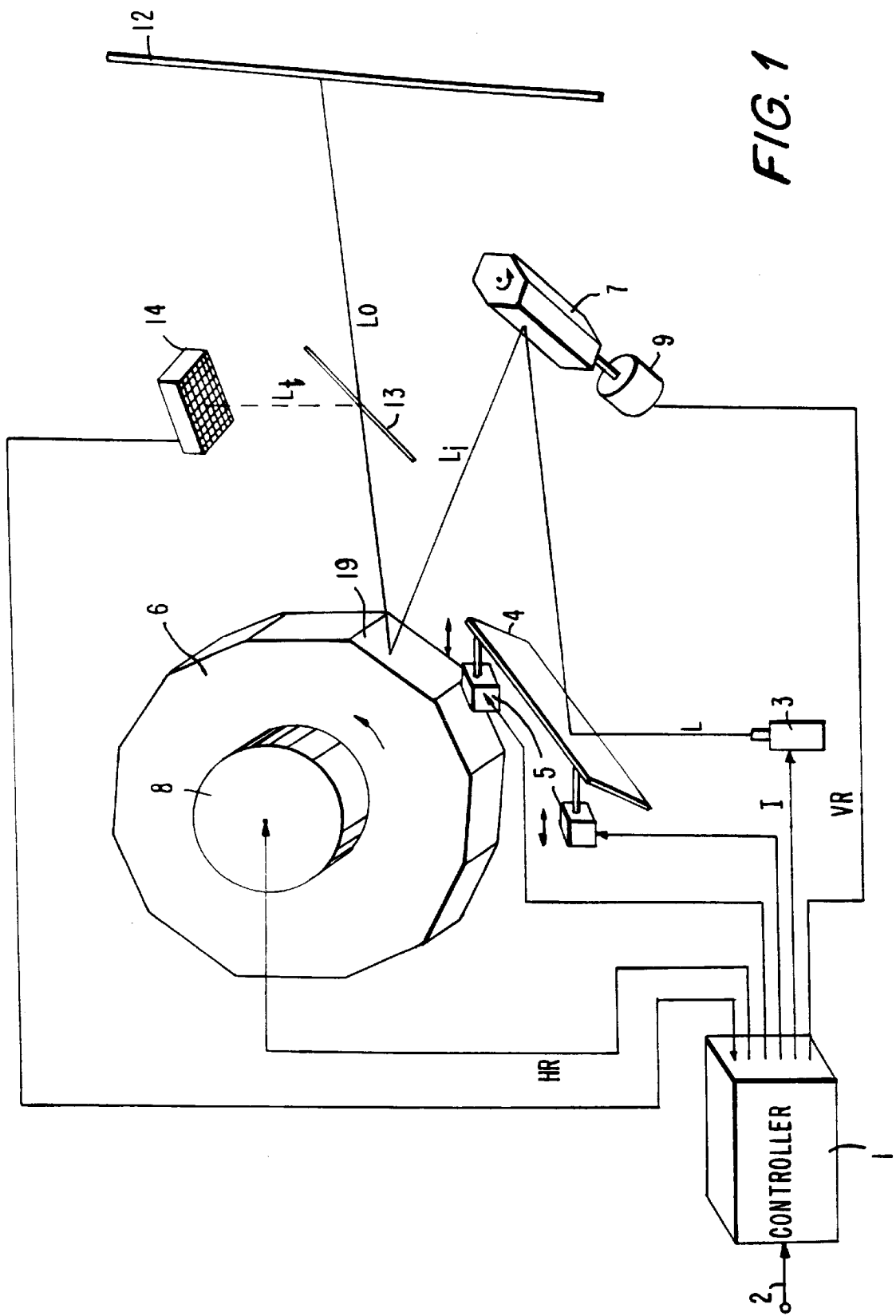
FIG. 1 shows a projection display apparatus according to of a first embodiment of the present invention.

FIG. 1 shows a first embodiment of the present invention, in which a video signal is applied to an input terminal 2 of a controller 1. The controller 1 generates a modulated drive signal I that is used to drive a solid-state laser 3. The beam first reflects from a correcting mirror 4. The correcting mirror 4 is positioned by piezoelectric transducers 5. The controller 1 activates the transducers 5 to position the correcting mirror 4, as will be explained below.

The controller 1 also generates horizontal and vertical motor control signals, HR and VR, that drive a horizontal motor 8 and a vertical motor 9 that rotate a horizontal scan mirror 6 and a vertical scan mirror 7, respectively. The beam L from the correcting mirror 4 is reflected from the vertical scan mirror 7 and the horizontal scan mirror 6 onto a viewing surface 12.

Figure 2A:
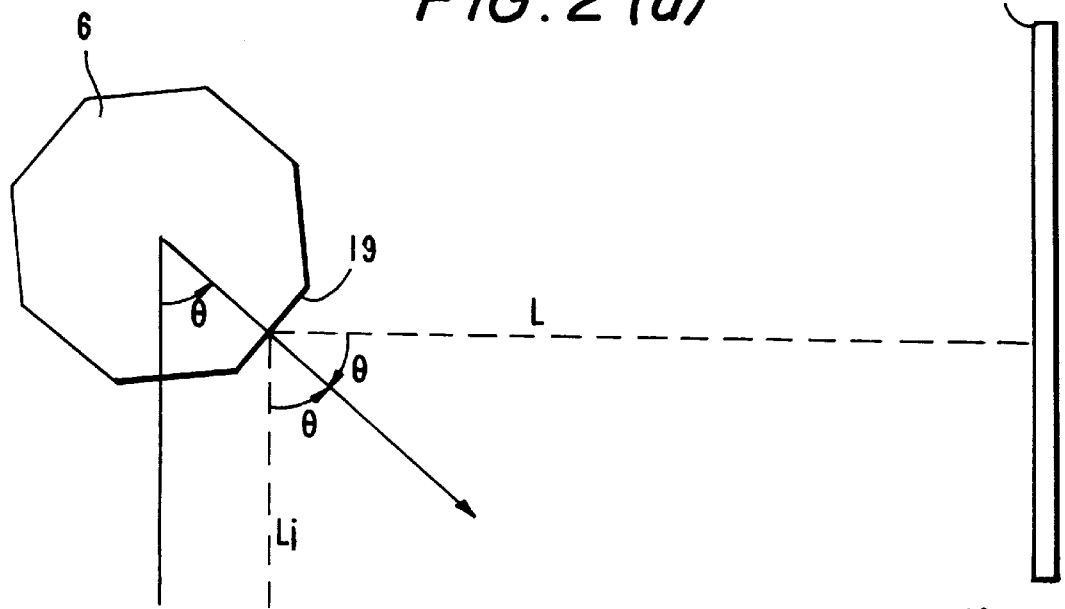
FIGS. 2(a), 2(b), and 2(c) show a detailed view of a horizontal scanning mirror according to the embodiment of FIG. 1.
Figure 2B:
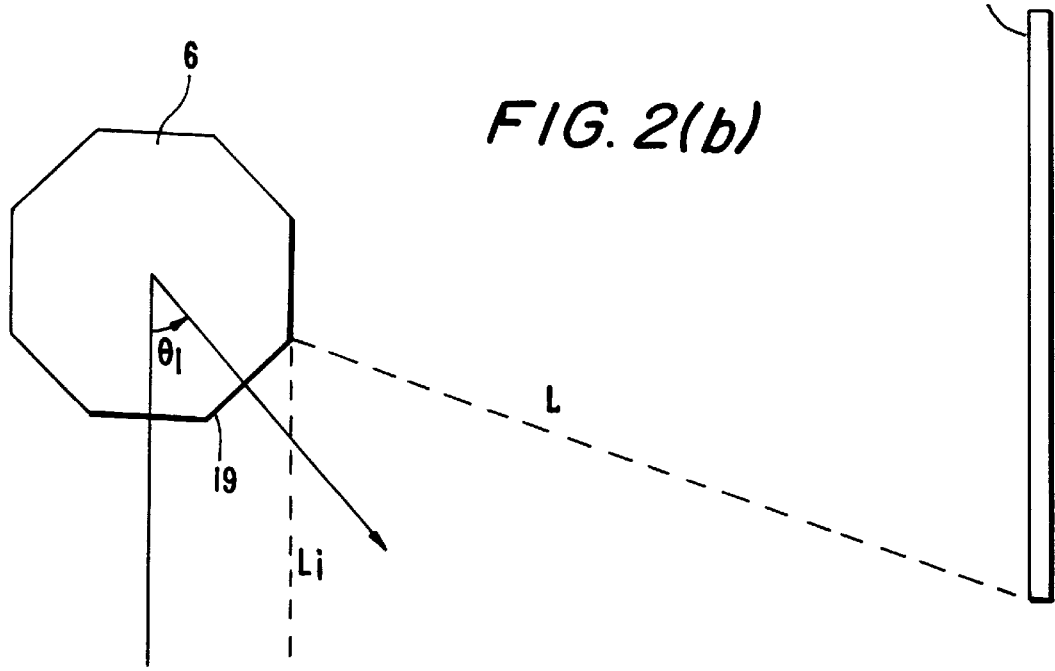

FIG. 2(a) shows the horizontal scan mirror 6 from above. An angle θ is defined as the angle between a line normal to a first face 19 of the mirror 6 and a line parallel to the incident beam $L_i$. As shown in FIG. 2(b), the incident beam $L_i$ is reflected through an angle $θ_1$ toward the screen 12. As the mirror 6 rotates through angles from $θ_1$, shown in FIG. 2(b), to angle $θ_2$, shown in FIG. 2(c), the beam L is scanned across the surface 12. The point on the first face of the mirror 19 where beam $L_i$ strikes the surface 19 moves from a leading edge of the surface 19, shown in FIG. 2(b), to a trailing edge, shown in FIG. 2(c).

The mirror 9 continues to rotate until the beam $L_i$ strikes the next face of the mirror 20 that directs the beam back to the position shown in FIG. 2(b).

Figure 2C:
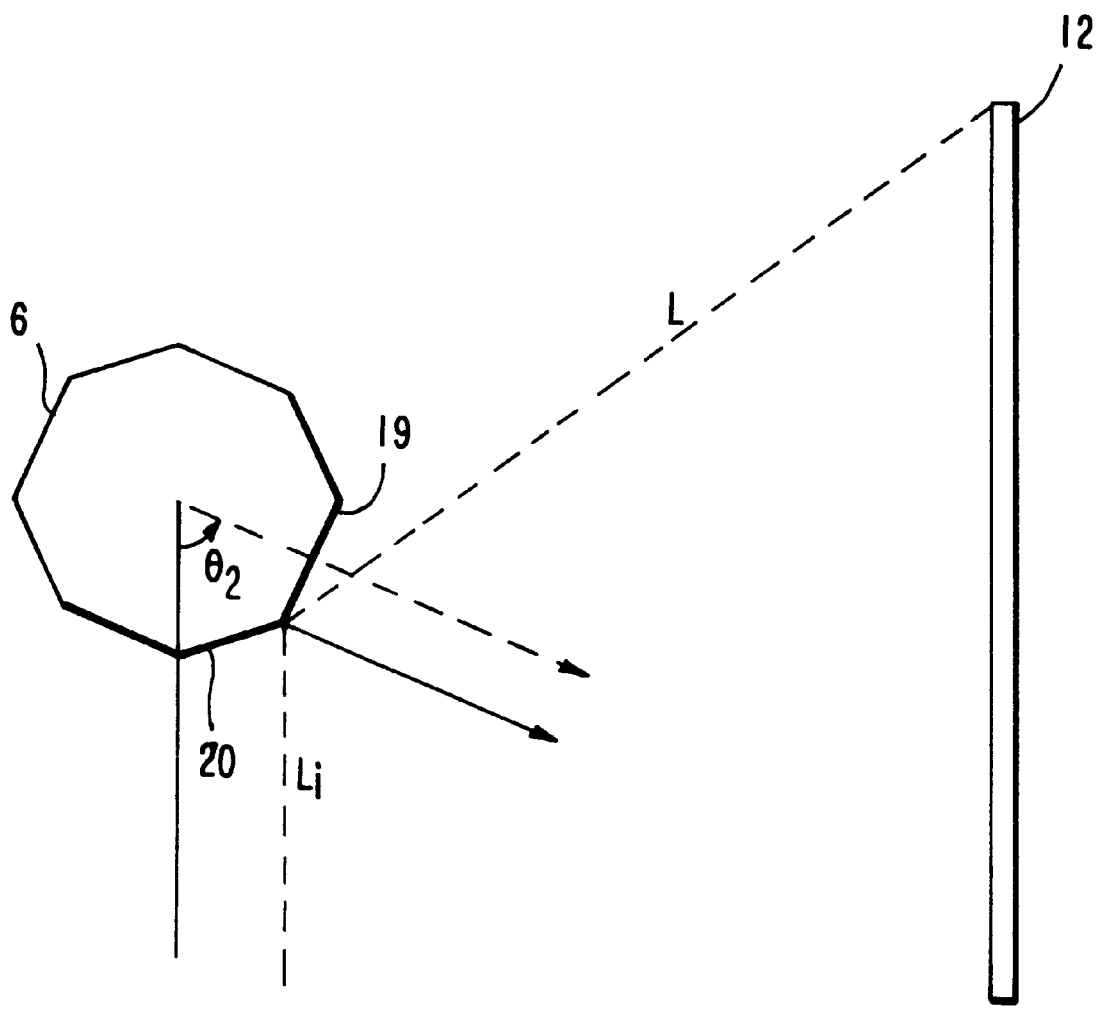

As the incident beam $L_i$ approaches the far edge of the first mirror face 19 as shown in FIG. 2(c) the controller 2 causes the laser 3 to turn off. This prevents light from being reflected toward the screen 12 during the transition between mirror faces 19 and 20, as shown in FIG. 2(c). As a result, the projected image on the screen 12 will not be distorted by manufacturing imperfections at the edges of the mirror faces 19, 20.

Turning the laser 3 off in this manner limits the range of angles θ that can be scanned by the beam thereby limiting the width of the viewing surface 12 that is illuminated.

In order to increase the width of the viewing surface 12 illuminated by the beam L the controller 1 causes the piezoelectric transducers 5 to adjust the position of the incident beam $L_i$ as the edge of the mirror face 19 is approached, as shown in FIG. 2(c). By adjusting the point on the mirror face 19 where the beam $L_i$ strikes, the horizontal rotating mirror 6 can rotate through a greater angle θ before the beam $L_i$ encounters manufacturing defects at the edge of the mirror face 19.

As shown in FIG. 1, the axis of the vertical scan mirror 7 is inclined at an angle from the axis of the horizontal mirror 6. Rotation of the vertical mirror 7 causes the reflected beam $L_i$ to move vertically along the face 19 of the horizontal mirror 6. Rotation of the mirrors 6, 7 is synchronized so that each horizontal scan of the beam shown in FIGS. 2(b) and 2(c) is displaced by a predetermined vertical separation corresponding to the vertical resolution of the video signal.

The intensity of the beam L is modulated by the controller 1 as it is scanned across the surface 12 to generate an image. The rotational velocities of the mirrors 6, 7 and the modulation of the laser 3 are adjusted to allow projection of an image of a selected resolution and aspect ratio.

Positioned between the horizontal scanning mirror 6 and the viewing surface 12 is a beam splitter 13 that directs a portion of the beam $L_t$ toward a sensor array 14. The sensor array 14 may be, for example, a charge coupled device (CCD) array. A signal from the sensor array 14 is sent to the controller 1.

The controller uses signals from the sensor array 14 to determine an instantaneous position of the beam $L_o$ on the viewing surface 12. This instantaneous position is compared with an expected position of the beam $L_o$. The angular position of the correcting mirror 4 is adjusted by the controller 1 using the transducers 5 to correct the position of the beam $L_o$.

The sensor array 14 is also used by the controller 1 to determine periodic distortions in the surfaces of the mirrors 6, 7 and in the drive motors 8, 9. During an alignment procedure the mirrors 6, 7 are rotated while the intensity of the beam L is held constant and the correcting mirror 4 remains stationary. By monitoring the beam position sensed by the sensor array 14, periodic distortions in the mechanism are stored by the controller 1. This stored mechanical data is then used by the controller 1 to rapidly correct for such distortions during operation.

During the alignment period the intensity of the beam $L_t$ is monitored as the beam nears the edges of the faces of the scanning mirrors 6, 7. The controller 1 uses this intensity data to determine the maximum usable width of each face of the mirrors 6, 7 since defects along the edges of the mirror faces 19, 20 will scatter the beam, reducing the intensity of $L_t$. For mirror faces where edge imperfections reduce the usable width the correcting mirror 4 is adjusted to momentarily move the beam $L_i$ away from the edge of that face as the edge is approached.

Figure 4:
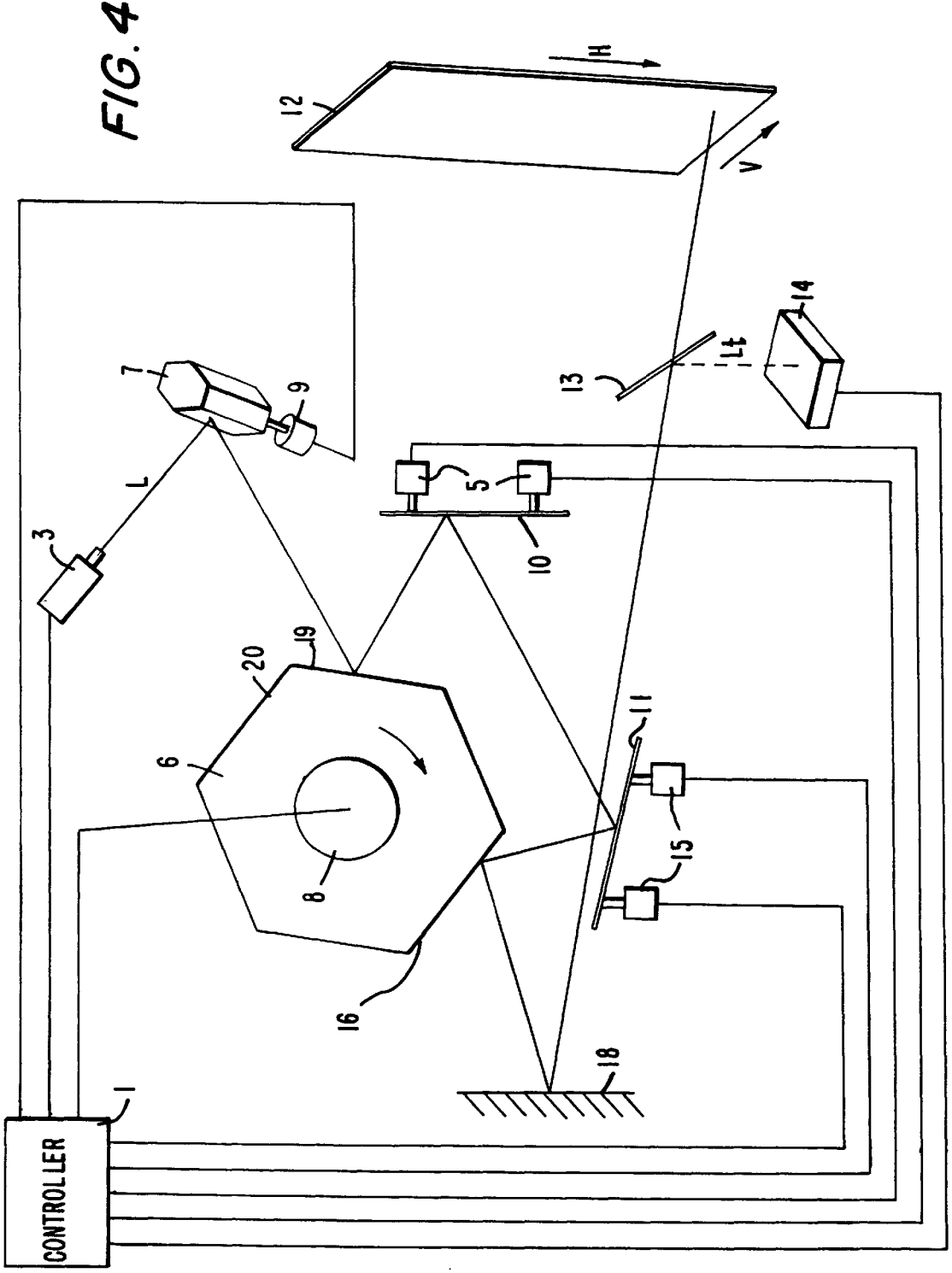
FIG. 4 shows the apparatus of FIG. 3 during a second rotational period.

FIGS. 3 and 4 show a second embodiment of the present invention. Again, a laser light source 3 produces a modulated laser beam L that has an intensity controlled by a controller 1. The beam L reflects from a vertical scan rotating mirror 7 and strikes a first face 19 of a horizontal scan rotating mirror 6. The vertical scan mirror 7 and horizontal scan mirror 6 are rotated by a vertical motor 9 and a horizontal motor 8, respectively, under the control of the controller 1.

During a first rotational period, shown in FIG. 3, the beam L strikes a lower portion of the first face 19 of the horizontal scan mirror 6 and is reflected toward a first correcting mirror 10. The beam L is reflected from the first correcting mirror 10 back to the face 19 of the horizontal scan mirror 6 and then toward the viewing surface 12. Rotation of the horizontal scan mirror 6 causes the point on the viewing surface 12 illuminated by the beam to scan in the direction of arrow H.

The first correcting mirror 10 is connected to transducers 5 that adjust the angular position of the mirror 10. A portion of the beam $L_t$ is reflected by a beam splitter 13 toward a sensor array 14. Signals from the sensor array 14 communicate the position and intensity of the beam to the controller 1.

Transducers 5 are controlled to correct for mechanical aberrations in the system based on the output from the sensor array 14 in the same manner as described in the first embodiment.

During a second rotational period, shown in FIG. 4, the horizontal mirror 6 has rotated so that the beam L strikes the upper portion of the face 19 of the horizontal scan mirror 6 and is reflected toward the first correcting mirror 10. The beam is then reflected toward a second correcting mirror 11 and then toward a second face 16 of the rotating mirror 6. The beam is reflected from the second face 16 toward a fixed mirror 18 that reflects the beam L toward the viewing surface 12. Again, rotation of the horizontal scan mirror 6 during the second rotational phase causes the point on the viewing surface 12 illuminated by the beam to scan in the direction of arrow H.

The horizontal mirror 6 continues to rotate and a succeeding face 20 of the horizontal scan mirror 6 takes the place of the first face 19. The process is repeated for each succeeding face of the horizontal scan mirror 6.

The second correcting mirror 11 is positioned by transducers 15 that adjust the angular position of the mirror 11 in response to control signals from the controller 1. The function of the transducers 15 and the second correcting mirror 11 is the same as for the transducers 5 and the first correcting mirror 10, that is, to adjust for mechanical aberrations in the apparatus. Nevertheless, since the path of the beam in the second rotational period, shown in FIG. 4 is different from the path in the first rotational period, shown in FIG. 3, the second correcting mirror 11 corrects only for aberrations during the second rotational period.

During each rotational period the vertical scan mirror 7 displaces the beam L in the vertical direction V, shown in FIGS. 3 and 4, so that during each horizontal scan the lines illuminated by the beam during the first and second rotational periods are separated in the direction of arrow V by a distance that corresponds with the vertical resolution of the displayed video image.

As illustrated above, the beam L is scanned across the viewing surface 12 once for each rotational period of each face of the horizontal scan mirror 6. As a result, the rotational velocity of the horizontal scan mirror 6 can be reduced by half of that for the first embodiment. Since the beam is reflected twice from the rotating horizontal scan mirror 6, during both the first and second rotational periods, the velocity of the beam across the viewing surface 12 is twice that for a beam reflected only once from a rotating mirror. Thus, the beam can be scanned across the entire width of the viewing surface 12 in half the time required by the apparatus of the first embodiment.

The embodiments described above are illustrations of the present invention. Those skilled in the art can vary the above embodiments while remaining within the spirit and scope of the present invention that is defined by the appended claims.

What is claimed is:

1. A display apparatus comprising:
   a laser light source for producing a laser beam with a modulated intensity;
   a correcting mirror disposed in a path of said beam for reflecting said beam in a direction determined by a control signal;
   a first rotating mirror having a plurality of first reflecting faces for reflecting said beam and for scanning said beam through a first predetermined range of angles at a first rotation rate;
   a second rotating mirror having a plurality of second reflecting faces for reflecting said beam and for scanning said beam through a second predetermined range of angles at a second rotation rate;
   a viewing surface disposed to receive said laser beam scanned through said first and second range of angles;
   beam position detecting means for sensing an instantaneous position of said beam and for generating a position signal indicating said instantaneous position; and
   a controller for controlling said first and second rotation rates so that said viewing surface is illuminated by said laser beam scanned across said viewing surface and for receiving said position signal and generating said control signal based on a difference between the instantaneous position of said beam and a predetermined pattern, whereby the direction of said beam reflected by the correcting mirror causes said beam to scan across the viewing surface according to the predetermined pattern,
   wherein said controller further comprises
      alignment means for monitoring the position signal during an alignment procedure and determining periodic deviations between a pattern scanned by the beam and the predetermined pattern, and for monitoring the intensity of said beam as said beam approaches each edge of said plurality of first and second reflecting faces for enabling said controller to determine a maximum usable width of each of said first and second reflecting faces and to adjust said correcting mirror to momentarily move said beam away from an imperfect edge as said imperfect edge is approached; and
   storage means for recording said periodic errors during the alignment procedure.

2. The apparatus according to claim 1 wherein the correcting mirror includes a transducer for receiving the control signal and for displacing a reflective surface in response to the control signal.

3. The apparatus according to claim 2 wherein the transducer includes a piezoelectric crystal.

4. The apparatus according to claim 1 wherein the beam position detecting means includes a beam splitter for directing a portion of the beam along a sensor axis and a plurality of sensors arranged in an array and disposed in a position to receive the portion of the beam along the sensor axis thereby generating said position signal.

5. A display apparatus comprising:
   a viewing surface;
   a laser light source for producing a laser beam with a modulated intensity;
   a first rotating mirror for reflecting said laser beam and scanning said beam through a range of vertical angles at a first rotation rate;

a second rotating mirror comprised of a plurality of reflective faces for receiving said laser beam reflected from said first rotating mirror through said range of vertical angles on a first reflective face and for reflecting said laser beam and scanning said beam through first and second ranges of horizontal angles in respective first and second rotational periods at a second rotation rate;

a first correcting mirror for receiving said beam reflected through said first and second ranges of horizontal angles, for reflecting said beam in said first range of horizontal angles during said first rotational period toward the first face of said second rotating mirror, whereby said beam is reflected from said first face of said second rotating mirror toward said viewing surface, and for reflecting said beam in said second range of horizontal angles during said second rotational period through a third range of horizontal angles, wherein an angular position of said first correcting mirror is adjusted in response to a first correction signal;

a second correcting mirror for receiving said beam reflected through said third range of horizontal angles during said second rotational period and for reflecting said beam toward a second face of said second rotating mirror, whereby said beam is reflected by said second face of said second rotating mirror and scanned through a fourth range of horizontal angles, and wherein an angular position of said second correcting mirror is adjusted in response to a second correction signal;

a fixed mirror for receiving said beam reflected through said fourth range of horizontal angles and for reflecting said beam toward said viewing surface, whereby rotation of said second rotating mirror causes said beam to scan across said viewing surface once during said first rotational period and once during said second rotational period;

beam position detecting means for detecting an instantaneous position of a region on said viewing surface illuminated by said beam and for generating a position signal; and a controller for receiving said position signal, for comparing the instantaneous position indicated by said position signal with a predetermined scan pattern, and for generating said first and second correction signals, whereby a deviation between the position illuminated by the beam and the predetermined scan pattern is reduced.

6. The apparatus according to claim 5 wherein the first and second correcting mirrors include a transducer for displacing a reflective surface in response to the respective first and second correction signals.

7. The apparatus according to claim 6 wherein the transducer includes a piezoelectric crystal.

8. The apparatus according to claim 5 wherein the beam position detecting means includes a beam splitter for directing a portion of said beam scanned across said viewing surface along a sensor axis and a plurality of sensors arranged in an array and disposed to receive the portion of said beam along said sensor axis.

9. The apparatus according to claim 8 wherein the sensors are pixels of a charge coupled device.

10. A method for displaying a video signal comprising the steps of:

modulating an intensity of a larger laser light source synchronously with said video signal to form a modulated laser beam;

reflecting said beam from a correcting mirror, thereby deflecting the beam along a correction angle;

reflecting said beam from a first rotating mirror having a plurality of first reflecting faces;

rotating said first mirror, thereby scanning said beam through a first range of angles;

reflecting said beam from a second rotating mirror having a plurality of second reflecting faces;

rotating said second mirror, thereby scanning said beam through a second range of angles, whereby scanning of the beam through said first and second ranges of angles causes the beam to traverse a pattern approximating a perdetermined pattern;

sensing an actual pattern of said beam scanned through said first and second ranges of angles;

determining a deviation between the actual pattern traversed by the beam and said predetermined pattern and controlling said correcting mirror to adjust said correction angle thereby reducing said deviation; and monitoring the intensity of said beam during an alignment procedure as said beam approaches each edge of said plurality of first and second reflecting faces for determining a maximum usable width of each of said first and second reflecting faces to adjust said correcting mirror to momentarily move said beam away from an imperfect edge as said imperfect edge is approached.

* * * * *